Patented Apr. 7, 1942

2,278,474

UNITED STATES PATENT OFFICE 2,278,474

TEA LEAF

Albert Musher, New York, N. Y., assignor, by mesne assignments, to Food Manufacturing Corporation, Chicago, Ill., a corporation of New York No Drawing. Application May 7, 1941, Serial No. 392,342

5 Claims. (Cl. 99—76)

The present invention relates to the processing of tea, and more particularly to green and black tea leaves.

Tea leaves, after they are harvested, are generally exposed to prolonged operations as, for example, curing, drying, roasting, firing, rolling, fermenting and so forth.

Also, with reference to brewing the finished tea leaves, it is difficult on the one hand to control the diffusion process so that the desired flavor may be obtained without excessive waste of the tea leaves, and on the other hand, it is difficult to use too small an amount of tea leaves in the brewing operation as this will require prolonged heating, boiling or long exposure to hot water, which may result in the development of astringent and acrid tastes and flavors which are not desirable and which detract from the desired tea flavor.

Also, in the brewing of tea, there is a tendency for some of the tea particles to sift through the tea bag or strainer, for example, thereby resulting in an undesirable sedimentation of the tea leaves in the cup.

It is among the objects of the present invention to prepare tea leaves, following their harvesting, so as to result in various advantages (including, for example, shorter periods of treatment, lower operating cost, and improved quality) with reference to the various processes which include for example, the roasting, steaming, firing, facing, rolling, and curing, drying, etc., of the tea leaves.

It is further among the objects of the present invention to prepare tea leaves so that the tea leaves will be of somewhat increased size either by expansion, or by opening of the tea leaves, etc., so as thereby to result in fewer tea leaves sifting out of the tea bag or strainer in which they are held while preparing the brewed tea.

Also, it is a purpose of the present invention to prepare tea leaves so that the diffusion process in the brewing of the tea may be more readily controlled, thereby enabling further economy in the use of the tea.

Still another object is to prepare improved tea leaves which may have improved water-wettable quality, and also which may be better powdered in making powdered tea preparations. Also, another object is to enable the preparation of a more quickly soluble or more quickly extractable tea, and a still further object is to produce tea of enhanced flavor characteristics.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accomplishing these objects the tea leaves are placed in a closed chamber in which they are subjected to an elevated pressure ranging, for example, from between 20 or 25 pounds per square inch to about 300 or 350 pounds per square inch and at a temperature ranging for example between 250° F. and 550° F.; and for a time period ranging, for instance, from 1 to 10 seconds, to 5 or 6 minutes, or longer, depending upon the results desired, and the equipment and other conditions that are used. During this procedure the chamber may or may not be rotated, as desired.

After the required time period, the chamber then is suddenly and instantaneously opened into a low pressure (preferably relatively unconfined) area, such as the atmosphere, whereupon the tea leaves are ejected from the chamber and result (particularly if the tea leaves that are used are the dry tea leaves of commerce), in an expanded or leaf opened condition, but generally without substantial disintegration, shattering or disruption of the unity of the tea leaves.

The pressure and temperature may be obtained by introducing saturated or superheated steam into the chamber, or if desired, the chamber may be externally heated, in which case steam may be admitted to the chamber, or, the moisture content of the tea leaves may be so regulated so that the moisture from within the tea leaves will generate the necessary pressure. For various modifications and results in carrying out this invention the steam may be moist or dry.

Also, various flavoring or perfuming materials such as fragrant flowers of the jasmine, gardenia, orange, etc., or other flavoring materials, either dry or liquid, or water, may be admitted or placed in the chamber so as to become impregnated within the tea leaves during this treatment, or so as to otherwise modify the resultant product.

It is of advantage many times to explode two or three varieties of teas in the chamber at the same time so as to enable a blending of flavor.

The procedure described herein may be used in conjunction with the tea leaves following harvesting so as to reduce the usual time period necessary for curing, and other treatments; so as to produce a more uniformly treated product; and so as to result in other advantages. For example, the tea leaves following harvesting may be given the treatment herein described after which the usual drying or roasting may take place. In such case the expanded or relatively more opened structure of the tea leaves enable lower roasting temperatures and improved uniformity in the roast.

If desired, the treatment described herein may be used at various points in the processing of the tea as, for example, the tea leaves may first be dried, then exploded as described herein, and then roasted, or the explosion may take place before or after the rolling of the tea leaves.

Also, with reference to destroying the oxidase or other enzymes affecting the flavor in the tea leaves the process herein described may be utilized.

In carrying out this invention, it is also possible to precook in water or other liquids, to steam, freeze, dry roast or oil roast, multiple explode, enzyme-treat, water wash or water soak the tea leaves in order to obtain the specific results required, as for example, in order to modify the structure disruption or the expansion of the leaves, and so forth. Also, various combinations of these embodiments may be utilized at different points in the procedure.

Wherever the tea leaves are to be exploded following any of these embodiments in which water or moisture is used, it generally will be necessary to dry the tea leaves as herein described prior to the subsequent explosion treatment.

When the tea leaves are frozen so as to enhance the breaking of the cells, the tea leaves should be given a slow freeze so as to build up relatively large ice crystals therein and so as thereby to aid in disrupting the cells. Also, for this freezing procedure, the tea leaves should have sufficient moisture within them so as to enable the formation of the ice crystals of sufficiently large size. If necessary, presteaming or other moisture absorption treatments may be used to incorporate a sufficient quantity of water within the tea leaves before the freezing procedure.

The advantage of using the multiple explosion treatment in the processing of the tea leaves is that lower temperatures and lower pressures may be utilized than would have to be used to produce relatively the same results if a single explosion were used. In the carrying out of multiple explosions, the explosion or chamber treatment above described is repeated one or more times. These repeated treatments may be carried on at the same temperatures and pressures, at higher temperatures and pressures, at lower temperatures and pressures, or at variable temperatures and pressures than the original explosion.

This invention may be carried out not only with leaves of the tea family but also with other leaves used for brewing purposes as for example rose leaves, mint leaves, strawberry leaves, spearmint leaves, peppermint leaves, and so forth.

Not only may this invention be carried out with the tea leaves but also it may be carried out with other parts of the tea plant as for example with the stems, leaf buds, tea fruits, and other portions that may be used for brewing purposes.

As a result of the explosion treatment described herein various advantages and conditions result. For example, a rolled, rather compacted or adhered-together tea leaf, as for example in various varieties of black tea leaves, is expanded so as to result in a more fluffy, generally relatively porous, more quickly water-penetratable or more readily water absorbent structure.

Also, as for example with various types of green tea leaves, there is an opening of the leaves so as to result in the appearance of the unrolled leaf.

Also, the removal or reduction of various acrid and astringent flavor qualities of the tea leaves is of advantage.

Further advantages with reference to the products of this invention deal with the producing of brewed tea of better flavor, and also of stronger flavor with the use of a reduced amount of tea leaves, the preparation of a more quickly water-extractable tea, the production of a tea from which various extractives such as tannin, caffeine and theine, for example, may be more easily extracted, and so forth.

As a general rule, before subjecting tea leaves to the procedure outlined herein, where the tea leaves have a relatively high moisture content, the moisture content of these tea leaves should be reduced to under 10% to 20% and most generally between 5% and 10%.

As an embodiment of this invention, various materials may be applied to or coated upon the tea leaves as, for example, sugars, or even gums, so as to protect the leaves against oxidation or deterioration after they have been subjected to the explosion treatment herein described. Generally these materials which are coated or applied to the tea leaves should be readily water soluble.

Longer treatments in the chamber, or treatments at higher temperatures or pressures may be utilized to develop a roasting of the tea leaves, where this is desired.

Whereas the rolling operation is apparently important with reference to the manufacture of tea leaves of commerce, in that this rolling apparently enables the solubility in the constituents to be increased, the utilization of this invention now permits this rolling of the leaves to take place so as to develop the desired quality and then subsequently, the expansion or unrolling of the leaf may take place by using the procedure herein described.

*Example I*

Commercial dry tea leaves are placed in a closed chamber and saturated steam is allowed to enter the chamber so as to build up as quickly as possible a pressure of 215 pounds per square inch at a temperature of about 395° F. The tea leaves are kept in the chamber under these conditions for a period of 20 seconds and immediately thereafter the chamber is suddenly opened to the atmosphere so as to result in an instantaneous drop in pressure, and ejection of the tea leaves.

*Example II*

Commercial black tea leaves are treated in accord with the process explained in Example I except that the time period is 10 seconds.

*Example III*

Green tea leaves of commerce are treated the same as described in Example I for black tea leaves. Upon ejection of the tea leaves from the chamber they will be noted to be relatively unrolled so as to present a leafy appearance.

Example IV

Commercial dry green tea leaves are treated in accord with the procedure outlined in Example I except that the time period is reduced to 10 seconds.

Example V

Green tea leaves of commerce are treated in accord with the procedure outlined in Example I except that the time period is reduced to 5 seconds. The process of this example differs from the process of Example III and Example IV in that the time period has been reduced so as to give the tea leaves a milder treatment.

What is claimed is:

1. An expanded, steam exploded, dry, unrolled tea leaf, said tea leaf resembling its original leafy condition.

2. A rolled tea leaf, said tea leaf being rolled together in relatively adhered form, said rolled tea leaf being in an expanded, steam exploded relatively dry condition.

3. The method of producing an expanded unrolled dry tea leaf, said method comprising subjecting the tea leaf to steam at an elevated temperature and pressure, and then suddenly releasing said temperature and pressure to a lower temperature and pressure.

4. A method of producing an expanded, rolled, dry tea leaf, said method comprising subjecting the tea leaf to steam at an elevated temperature and pressure, and then suddenly releasing said temperature and pressure to a lower temperature and pressure.

5. The method of producing a tea leaf of improved quality, said method comprising subjecting the tea leaf after harvesting and prior to its finished curing to steam at an elevated temperature and pressure, and then suddenly releasing said temperature and pressure to a lower pressure and temperature.

ALBERT MUSHER.